3,065,213
HOMOPOLYMERS OF ALLYL GLYCIDYL ETHER
Edwin J. Vandenberg, Wilmington, Del., assignor to Hercules Powder Company, Wilmington, Del., a corporation of Delaware
No Drawing. Filed Sept. 2, 1959, Ser. No. 837,571
2 Claims. (Cl. 260—88.3)

This invention relates to new polymeric materials and more particularly to high molecular weight polymers of allyl glycidyl ether.

In accordance with this invention is has been found that allyl glycidyl ether,

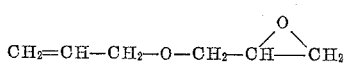

may be polymerized with the polymerization taking place predominantly through the epoxy group to yield high molecular weight amorphous polymers.

The new high molecular weight polymers of allyl glycidyl ether according to this invention are tacky, rubbery products having a reduced specific viscosity of at least about 0.5 when measured as a 0.1% solution in cyclohexanone at 50° C. The new polymers of this invention are linear, unsaturated polyethers having predominantly

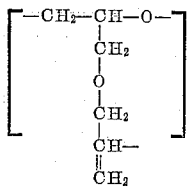

repeating units, and can be further polymerized or copolymerized through the unsaturated ethylenic substituent groups to an insoluble, infusible state. The new polymers of allyl glycidyl ether according to this invention can also be vulcanized with sulfur. These new polymers, therefore, are useful as vulcanized compositions in a manner analogous to commercial vulcanized elastomers. They may also be bulk copolymerized with vinyl monomers such as styrene, acrylates or methacrylates. Such compositions may be useful for making cast polymerized articles, for protective coatings and, after reinforcing with fiberglass or other fillers, for making a wide variety of structural objects in the same manner as the commercial "polyester resins."

The new high molecular weight polymers of allyl glycidyl ether may be conveniently prepared by contacting allyl glycidyl ether with an aluminum alkyl as catalyst. Any aluminum alkyl may be used, as, for example, trialkylaluminum, a dialkylaluminum monohalide, a dialkylaluminum monohydride, a monoalkyl aluminum dihydride, a dialkylaluminum monoalkoxide, etc. The alkylaluminum compound may be used as such or it may be complexed with an ether such as tetrahydrofuran, or reacted with a chelating agent such as acetylacetone, or with water within specified molar ranges. When the alkyl aluminum compound is reacted with water, the amount of water will usually be within the range of 0.5 to 1 mole of water per mole of alkylaluminum compound, but a ratio of from about 0.1:1 to about 2:1 may be used. The alkyl group of the alkylaluminum compound may be any alkyl, as, for example, methyl, ethyl, butyl, isobutyl, hexyl, octyl, etc.

The polymerization reaction may be carried out in bulk but generally is carried out in a solution or suspension in an inert organic diluent. Exemplary of the diluents that may be used are the ethers such as diethyl ether, dipropyl ether, etc., halogenated hydrocarbons such as chlorobenzene, methylene chloride, etc., a hydrocarbon diluent such as n-heptane, cyclohexane, benzene, toluene, etc., or mixtures of these, as desired.

The polymerization reaction may be carried out at any desired temperature and pressure. Usually atmospheric or autogenous pressure will be used and a temperature of from about −80° C. to about 150° C. and preferably from about −30° C. to about 100° C. will be used.

The following examples will illustrate the preparation of the new polymers of allyl glycidyl ether. All parts and percentages are by weight unless otherwise indicated. The molecular weight of the polymers is shown by their reduced specific viscosity (RSV). By the term "reduced specific viscosity" is meant the $\eta_{sp}/c$ determined on a 0.1% solution of the polymer in cyclohexanone at 50° C.

Example 1

A polymerization vessel in which air had been replaced by nitrogen was charged with 17.2 parts of diethyl ether and 10 parts of allyl glycidyl ether. After equilibrating at 30° C., 5.6 parts of a solution of the catalyst was injected. The catalyst was prepared by diluting a 1.53 molar solution of triethylaluminum in n-heptane to 0.5 molar with diethyl ether, cooling in ice water and then injecting 0.5 mole of water per mole of triethylaluminum, venting as necessary. The catalyst solution was then agitated for about 22 hours at 30° C. and was stored at room temperature.

The polymerization was conducted with agitation for 19 hours at 30° C., whereupon 4 parts of anhydrous ethanol was added to stop the polymerization, and about 40 parts of diethyl ether was added to the reaction mixture. The ether-insoluble polymer which was formed was collected in a centrifuge, washed once with diethyl ether, and then with diethyl ether containing 0.2% of 4,4'-thiobis(6-tert-butyl-m-cresol). The washed polymer was dried 16 hours at 50° C. under vacuum. The polymer so obtained was a filmlike solid.

The ether-soluble polymer which was formed, which was also soluble in methanol, was recovered by precipitation from the ether-diluted reaction mixture with about 10 volumes of methanol containing 20% water and 0.2% 4,4'-thiobis(6-tert-butyl-m-cresol). The precipitated polymer was washed twice with 80:20 methanol:water (by volume), and dried 16 hours at 50° C. under vacuum. The recovered polymer was a very tacky rubber with an RSV of 0.86 measured as a 0.1% solution in cyclohexanone at 50° C. Infrared absorption showed the polymer to contain about 33% allyl groups (theory 36.0%), thus demonstrating that the polymerization had taken place predominantly through the epoxide grouping to form a polymer having predominantly

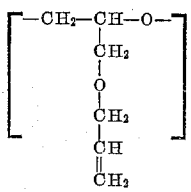

repeating units, and the carbon and hydrogen analysis on this polymer were in agreement with the theoretical values for a polymer having such repeating units.

This polymer was vulcanized by milling 100 parts of the polymer with 50 parts of carbon black, 2 parts of sulfur, and 1.5 parts of mercaptobenzothiazole for 10 minutes and then press curing at 300° F. for 45 minutes. The vulcanizate so obtained was pliant and rubbery. It had a tensile strength of 500 p.s.i., a tensilem odulus of 400 p.s.i. at 100% elongation, an ultimate elongation of 120%, a Shore (A) hardness of 50 and a break set of 5%.

Example 2

A polymerization vessel in which air had been replaced by nitrogen was charged with 25.6 parts of diethyl ether and 20 parts of allyl glycidyl ether. After equilibrating at 30° C., 11.2 parts of a catalyst solution was injected. The catalyst was prepared in the same manner as the catalyst set forth in Example 1, except that 0.6 mole of water per mole of triethylaluminum was used instead of 0.5 mole of water as described in Example 1.

The polymerization was conducted with agitation for 19 hours at 30° C., whereupon 11.2 parts of the same catalyst solution as used initially was added, and after carrying out the polymerization reaction for an additional 8 hours at 30° C., 8 parts of anhydrous ethanol was added. Diethyl ether was added to the reaction mixture to give a handleable viscosity, and the resulting diluted reaction mixture was then washed three times with an aqueous solution containing 10% sodium hydroxide, each washing being stirred for 1 hour. The reaction mixture was then washed with water until neutral, and a quantity of 4,4'-thiobis(6-tert-butyl-m-cresol) equivalent to 0.3% based on the polymer in the reaction mixture was added. The solvent was then removed by evaporation to yield 7.3 parts of dried polymer. It was a tacky, rubber which was purified by dissolving in 63 parts of methanol and precipitating therefrom by adding 20 parts of water. The precipitated polymer was collected, washed with 80:20 methanol:water (by volume) and once with 80:20 methanol:water (by volume) containing 0.2% of 4,4'-thiobis(6-tert- butyl-m-cresol), and then dried in vacuum at 50° C. for about 16 hours. The purified polymer was a tacky rubber having an RSV of 1.2.

This is a continuation-in-part of my copending application Serial No. 738,626, filed on May 29, 1958, now abandoned.

What I claim and desire to protect by Letters Patent is:

1. As a new composition of matter an amorphous, tacky, rubberlike homopolymer of allyl glycidyl ether having a reduced specific viscosity of at least about 0.5 as measured on a 0.1% by weight solution in cyclohexanone at 50° C., said homopolymer consisting of repeating units of the structure

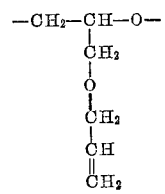

2. As a new composition of matter an amorphous, tacky, rubberlike homopolymer of allyl glycidyl ether having a reduced specific viscosity of at least about 0.5 as measured on a 0.1% by weight solution in cyclohexanone at 50° C., said homopolymer substantially consisting of repeating units of the structure

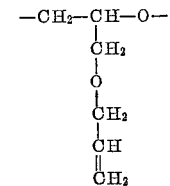

References Cited in the file of this patent

UNITED STATES PATENTS

| | | |
|---|---|---|
| 2,450,234 | Evans et al. | Sept. 28, 1948 |
| 2,464,753 | Shokal et al. | Mar. 15, 1949 |
| 2,556,075 | Erisbson | June 5, 1951 |
| 2,574,546 | De Groote | Nov. 13, 1951 |
| 2,574,817 | De Groote | Nov. 13, 1951 |

OTHER REFERENCES

Report on Nomenclature in the Field of Macromolecules, Journal of Polymer Science, vol. 8, pages 257–277.

Cragg: Journal of Colloid Science, vol. 1, pages 261–269 (1946).